(12) United States Patent
Bai

(10) Patent No.: US 11,519,520 B2
(45) Date of Patent: Dec. 6, 2022

(54) INDICATOR STRUCTURE AND GAS VALVE WITH INDICATOR

(71) Applicant: Yi-Jhih Bai, Taichung (TW)

(72) Inventor: Yi-Jhih Bai, Taichung (TW)

(*) Notice: Subject to any disclaimer, the term of this patent is extended or adjusted under 35 U.S.C. 154(b) by 0 days.

(21) Appl. No.: 17/367,648

(22) Filed: Jul. 6, 2021

(65) Prior Publication Data

US 2022/0034421 A1 Feb. 3, 2022

(30) Foreign Application Priority Data

Jul. 29, 2020 (TW) .................................. 109209513

(51) Int. Cl.
*F16K 37/00* (2006.01)
*F16K 31/60* (2006.01)

(52) U.S. Cl.
CPC .......... *F16K 37/0008* (2013.01); *F16K 31/60* (2013.01)

(58) Field of Classification Search
CPC ..... F16K 37/0008; F16K 13/60; F16K 31/607
See application file for complete search history.

(56) References Cited

U.S. PATENT DOCUMENTS

| | | | | |
|---|---|---|---|---|
| 3,154,097 A | * | 10/1964 | Wolff | F16K 5/162 |
| | | | | 251/192 |
| 3,154,288 A | * | 10/1964 | Tripoli | F16K 3/28 |
| | | | | 251/335.1 |
| 4,133,288 A | * | 1/1979 | Burgess | F16K 37/0008 |
| | | | | 137/553 |
| 5,076,308 A | * | 12/1991 | Cohen | F16K 37/0016 |
| | | | | 74/553 |
| 2005/0045231 A1 | * | 3/2005 | Hannah | F16K 37/0058 |
| | | | | 137/553 |

FOREIGN PATENT DOCUMENTS

FR 2910585 A1 * 6/2008 ........... F16K 31/508

* cited by examiner

*Primary Examiner* — Patrick C Williams

(57) ABSTRACT

A gas valve includes a body, a knob and a pin. The pin is connected to the knob and contacts the body. When the knob is rotated to drive the valve between a turn-off position and a turn-off position. The knob and the valve are threadedly co-rotated to change the distance of the knob relative to the body. When the knob and the valve are rotated to the turn-off position, the pin protrudes beyond the through hole. When the knob and the valve are rotated to the turn-on position, the pin does not protrude beyond the through hole. The users are acknowledged the gas valve is turned off or turned on by the position of the pin.

9 Claims, 6 Drawing Sheets

INDICATOR STRUCTURE AND GAS VALVE WITH INDICATOR

BACKGROUND OF THE INVENTION

1. Field of the Invention

The present invention relates to an indicator structure, and more particularly, to an indicator cooperated with a gas valve so as to acknowledge the users the gas vale is in turn-on status or turn-off status.

2. Descriptions of Related Art

Safety is the first concern when using gas burner and the users have to operate a switch knob to ensure the gas is released or not. And the switch knob generally includes a mark to indicate the correct position to show the turn-on status and the turn-off status. In some cases, the switch knob is overly rotated and stocked at that position, the users may mistakenly judge the gas status to cause dangerous results.

When using gas tube to provide gas to a burner, because the dark for putting the gas tube is small and limited, or the space is dark so that the users cannot see the mark of the switch knob, so that the users judge the gas status when rotating the switch knob by experience. In some situations, the switch knob does not return its correct position so that the gas still release from the gas tube, and the released gas may be ignited accidentally.

Therefore, whether the switch knob is correctly turn-on or turn-off becomes a safety issue for the users as the users cannot recognize the status of the switch knob.

The present invention intends to provide an indicator structure and an indicator cooperated with a valve to eliminate shortcomings mentioned above.

SUMMARY OF THE INVENTION

The present invention relates to a gas valve and comprises a body, a knob and a pin. The body includes a gas path, and the valve is threadedly connected to the body to open the gas path or close the gas path. The valve includes a top end. The knob includes a bore. The top end of the valve is fixed to the bore and exposed beyond the body. The body includes a restriction face and the valve is located at the center of the restriction face. A through hole is defined through the knob. The pin movably extends through the through hole and includes a first end and a second end. The first and second ends respectively protrude beyond two ends of the through hole of the knob. The second end of the pin contacts the restriction face. When the knob is rotated to drive the valve to a turn-off position, the first end of the pin protrudes beyond the through hole. When the knob is rotated to drive the valve to a turn-on position, the first end of the pin does not protrude beyond the through hole.

The present invention also provides an indicator structure and comprises a knob having a through hole defined therethrough. A pin movably extends through the through hole. The pin includes a first end and a second end, wherein the first and second ends of the pin are respectively located beyond the through hole. When the pin is applied by a force, the pin is moved axially in the through hole.

The primary object of the present invention is to provide an indicator structure for a gas valve, and the users can easily tell the gas valve is turned on or turned off by the position of the pin.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
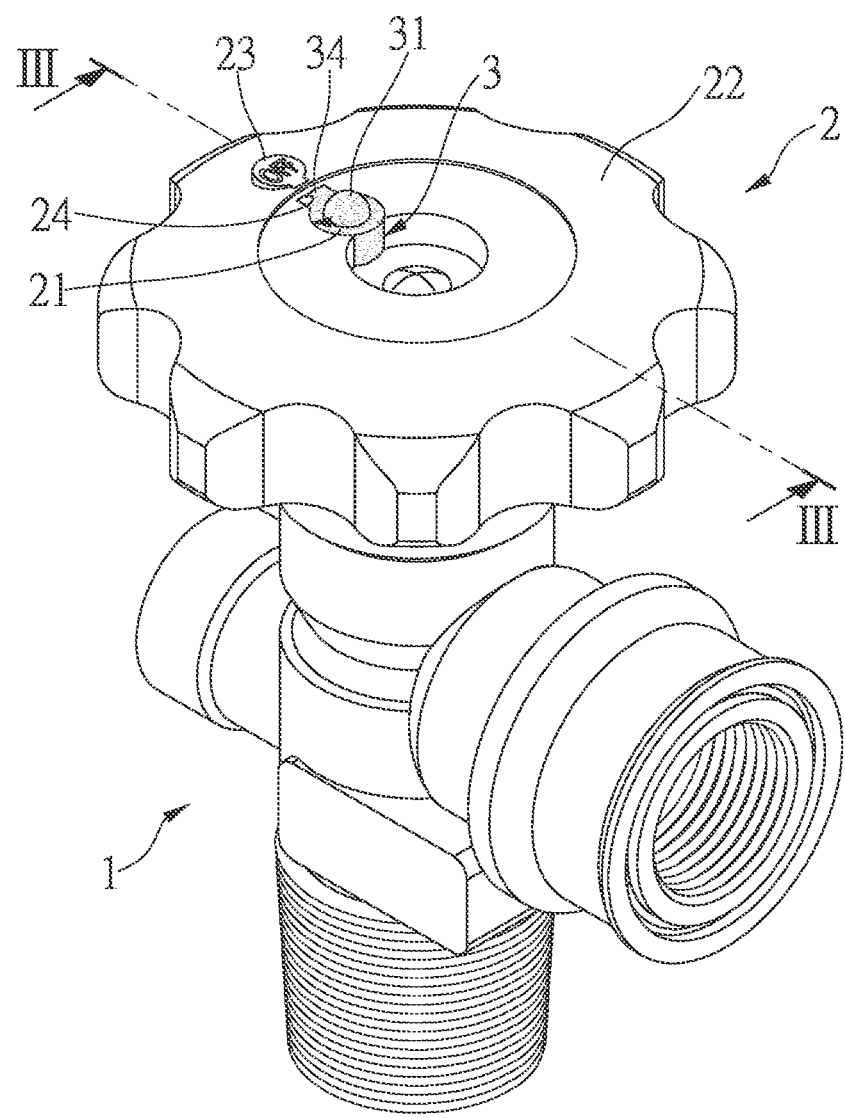
FIG. 1 is a perspective view to show the indicator structure cooperated with a gas valve.
Figure 2:
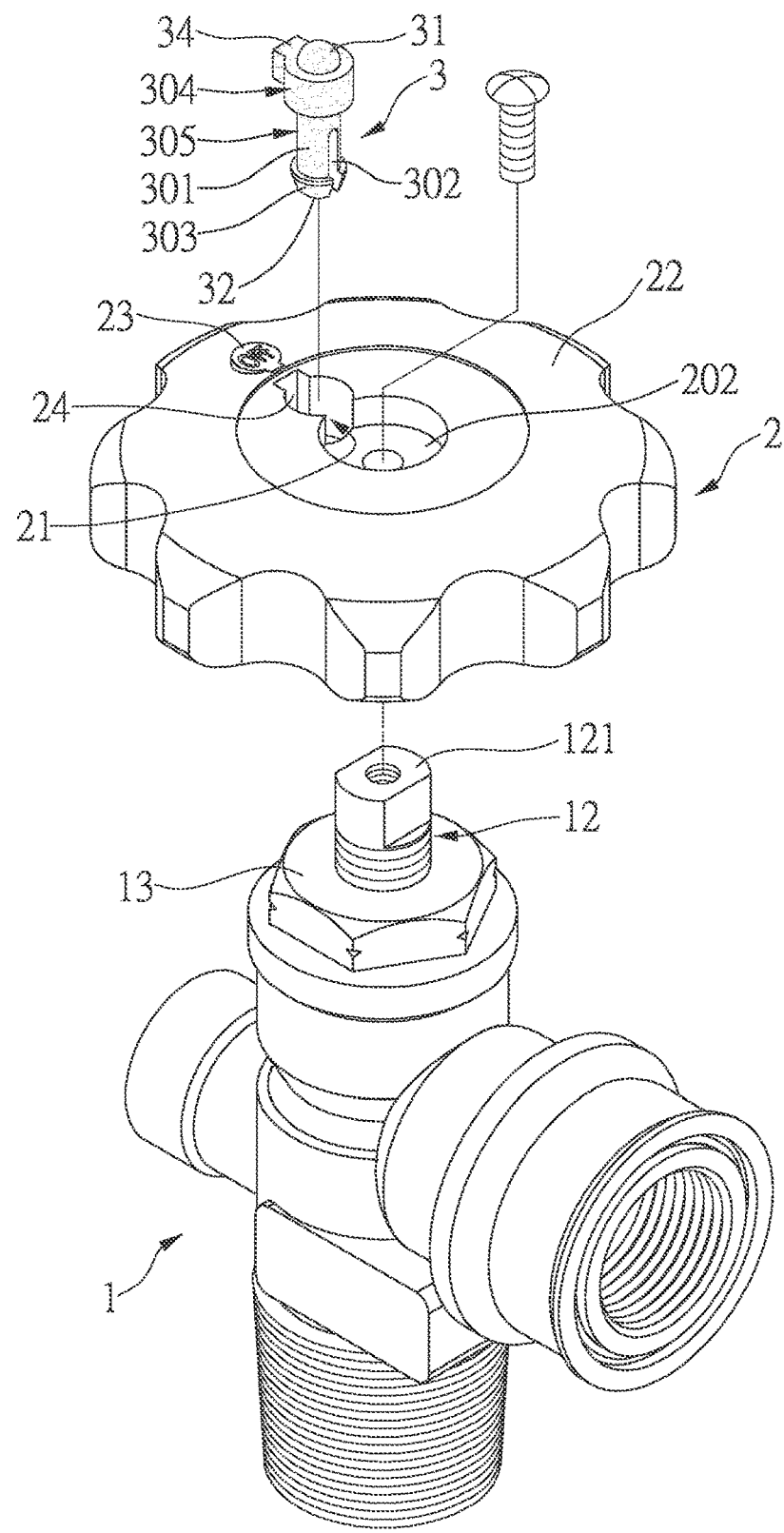
FIG. 2 is an exploded view of the indicator structure and the gas valve.
Figure 3:
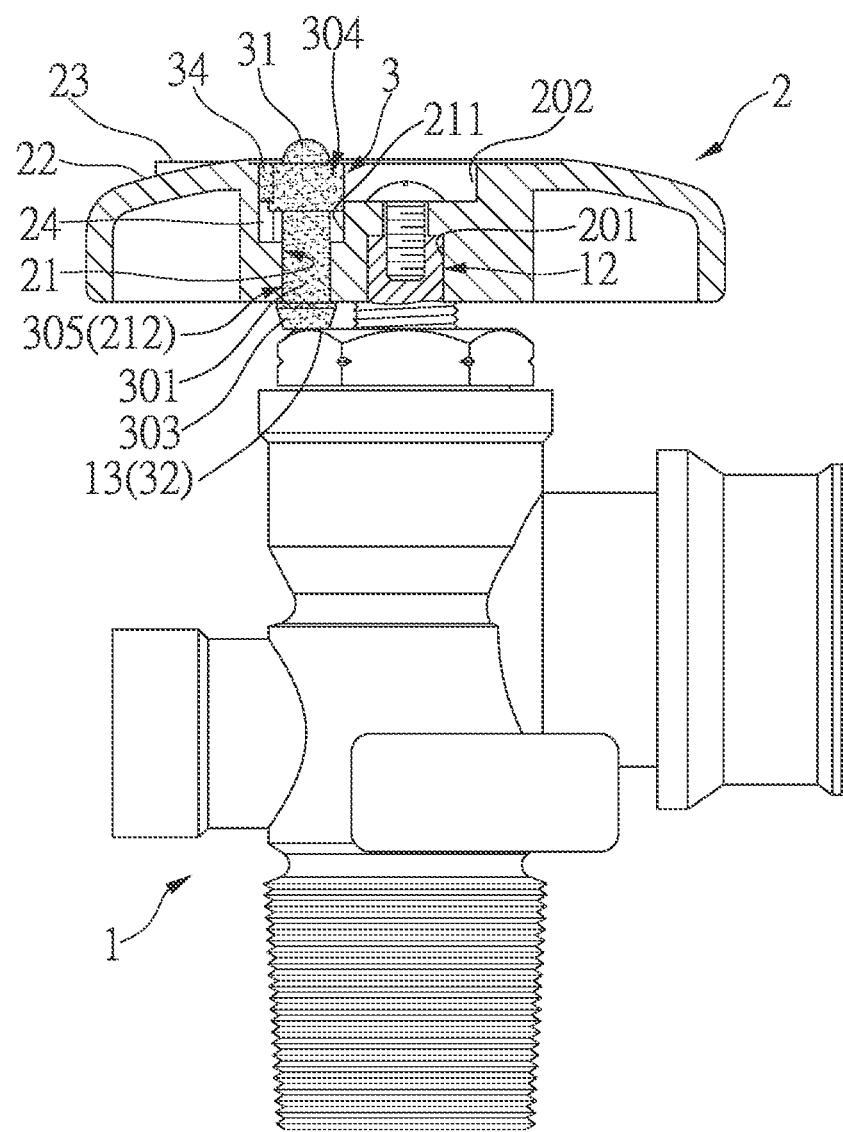
FIG. 3 is a cross sectional view, taken along line III-III in FIG. 1.
Figure 4:
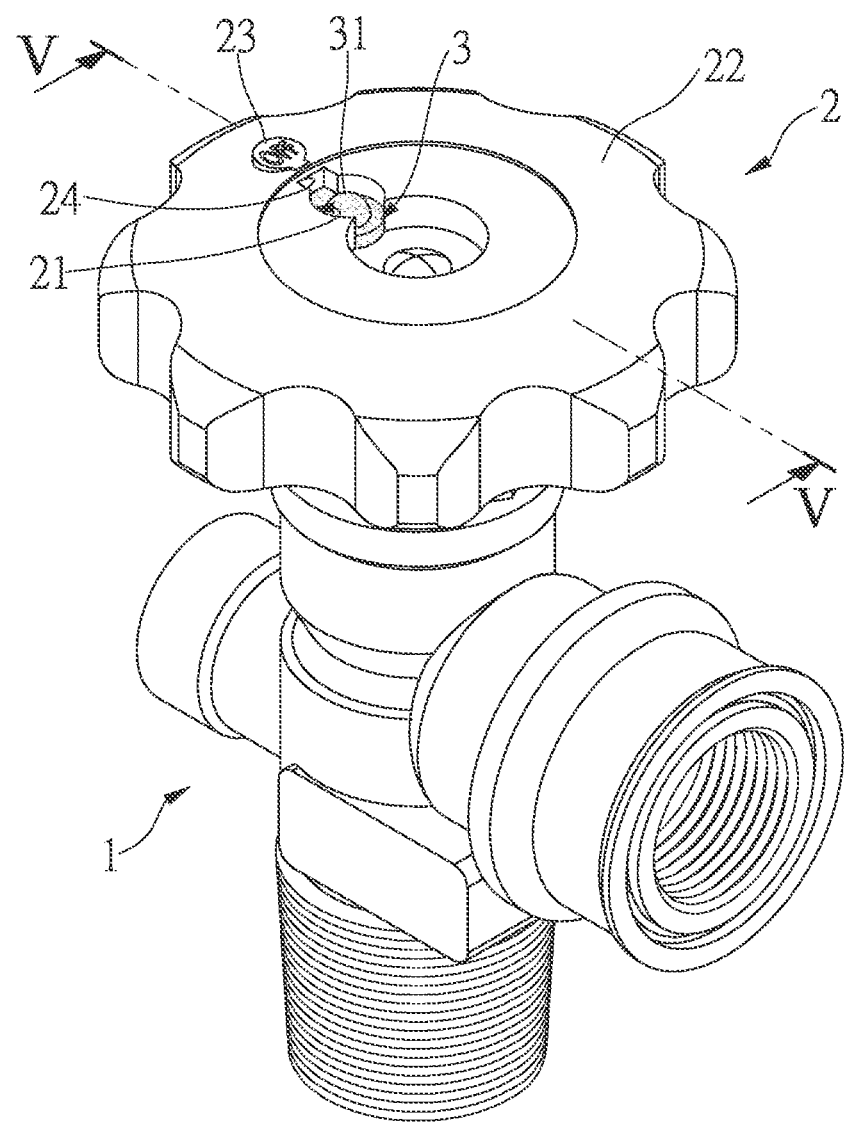
FIG. 4 shows that the valve is in turn-on position.
Figure 5:
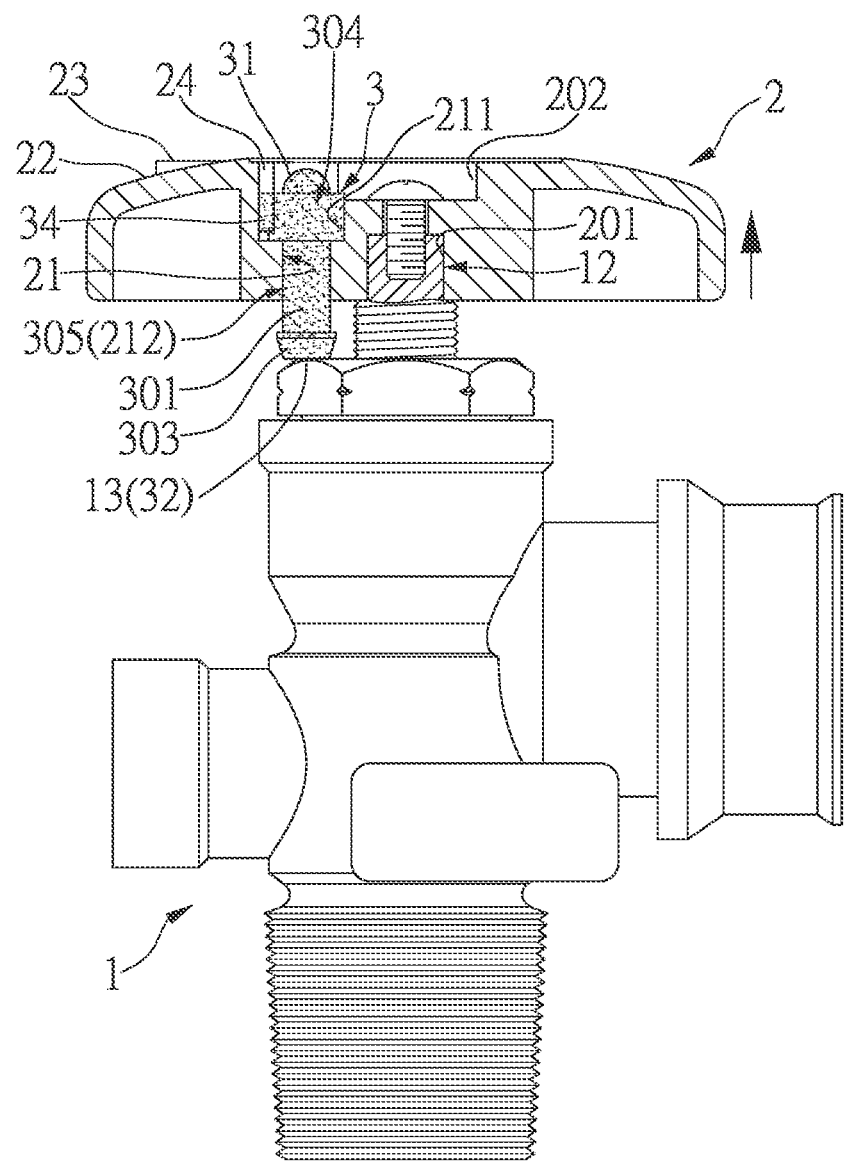
FIG. 5 is a cross sectional view, taken along line V-V in FIG. 4.

Referring to FIGS. 1 and 2, the gas valve of the present invention comprises a body 1, a knob 2 and a pin 3.

As shown in FIGS. 1 to 5, the body 1 includes a gas path (not shown). The valve 12 is threadedly connected to the body 1 so as to open the gas path or close the gas path. The valve 12 includes a top end 121. The knob 2 has a bore 201 wherein a bolt is used to extend through the bore 201 and is connect to the threaded hole of the top end 121 of the valve 12. The top end 121 of the valve 12 protrudes beyond the body 1. The body 1 includes a restriction face 13 and the valve 12 is located at the center of the restriction face 13. A through hole 21 is defined through the knob 2 and will be described later.

The pin 3 movably extends through the through hole 21 and includes a first end 31 and a second end 32. The first and second ends 31, 32 respectively protrude beyond two ends of the through hole 21 of the knob 2. The second end 32 of the pin 3 contacts the restriction face 13. When the knob 2 is rotated to drive the valve 12 to a turn-off position, the first end 31 of the pin 3 protrudes beyond the through hole 21. When the knob 2 is rotated to drive the valve 12 to a turn-on position, the first end 31 of the pin 3 does not protrude beyond the through hole 21.

The pin 3 is movably connected to the knob 2, and the second end 32 of the pin 3 contacts the restriction face 13 due to gravity, so that when the users rotate the knob 2 between the turn-on and the turn-off positions, the knob 2 is threadedly co-rotated with the valve 12 relative to the body 1 so that the knob 2 is moved either close to the body 1 or away from the body 1. When the knob 2 is rotated to drive the valve 12 to a turn-off position, the knob 2 moves toward the body 1, the first end 31 of the pin 3 protrudes beyond the through hole 21. When the knob 2 is rotated to drive the valve 12 to a turn-on position, the knob 2 moves away from the body 1, the first end 31 of the pin 3 does not protrude beyond the through hole 21. In other words, the pin 3 moves axially in the through hole 21 so that the users can check whether the first end 31 of the pin 3 protrudes beyond the through hole 21 or not to judge the status of the gas valve. The users see the pin 3 or to touch the pin 3 to know the status of the gas valve.

The color of the pin 3 is different from the color of the knob 2 to provide more information about the status of the gas valve.

As shown in FIGS. 1 to 5, the pin 3 includes two legs 301 and a gap 302 is formed between the legs 301. Each leg 301 includes an enlarged head 303 which is located close to the second end 32 of the pin 3 to restrict the pin 3 from being separated from the through hole 21 upward because the enlarged head 303 is stopped by the periphery of the through hole 21. When installing the pin 3 to the through hole 21, the two enlarged heads 303 can be pushed toward each other to narrow the gap 302 by the inner periphery of the through hole 21. Until the two enlarged heads 303 protrude beyond the through hole 21, the legs 301 bounce back.

The knob 2 includes a top surface 22 and a mark 23 is formed to the top surface 22. The through hole 21 opens through the top surface 22. A notch 24 is defined in the inner periphery of the throughhole 21 and extends toward the mark 23. The pin 3 includes a protrusion 34 extends radially from the outer periphery of the first end 31 of the pin 3. The protrusion 34 extends toward the notch 24 and the mark 23. The mark 23 protrudes from the top surface 22 and is located corresponding to the turn-off position. The pin 3 cannot spin because of the protrusion 34 is engaged with the notch 24. The protrusion 34 extends toward the mark 23 which is located corresponding to the turn-off position, so that the mark 23 can be marked as "OFF" which protrudes from the top surface 22.

The first end 31 of the pin 3 is a curved end, so that the user can easily acknowledged that his or her finger touches the pin 3 or the top surface 22 of the knob 2.

Figure 6:
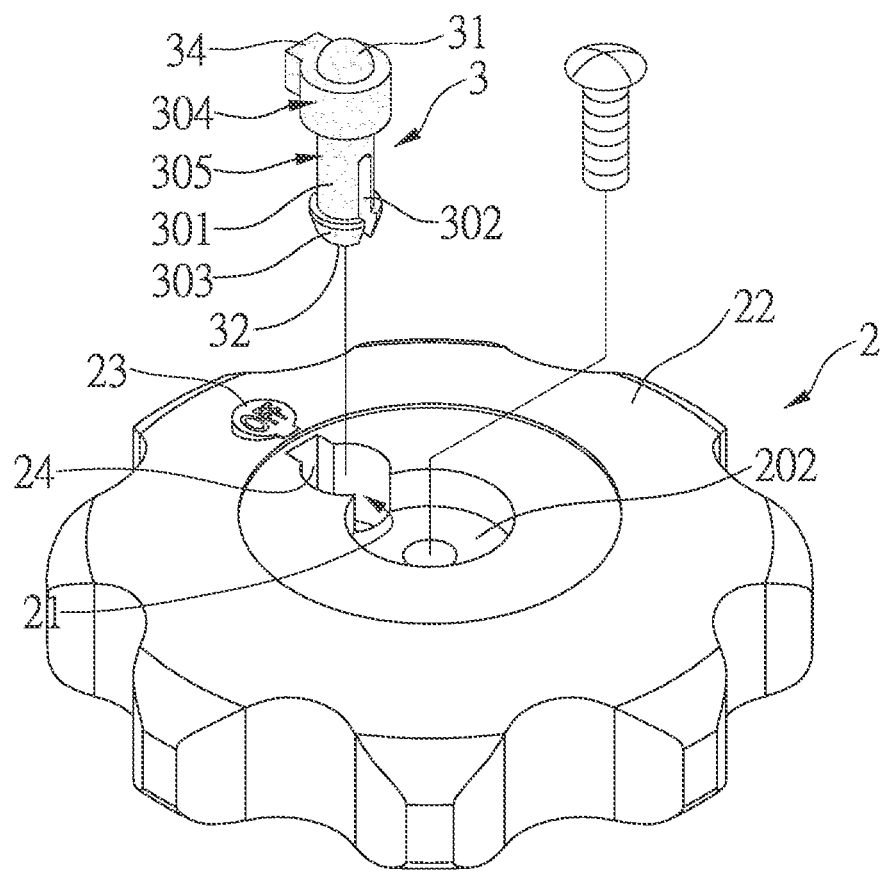
FIG. 6 is an exploded view of the indicator structure of the present invention.

The combination of the knob 2 and the pin 3 of the present invention can easily replaces the conventional knob of the gas valve as shown in FIGS. 2 and 6.

The knob 2 includes a bore 201 defined centrally therethrough, and the through hole 21 is located in the radial direction of the bore 201. That is to say, the through hole 21 is located between the mark 23 and the bore 201. The knob 2 includes a recess 202 formed in the top surface 22 thereof. The recess 202 communicates with the bore 201 and the through hole 21. A portion of the pin 3 is located between the through hole 21 and the recess 202. By this arrangement, the top surface 22 of the knob 2 is able to have the pin 2 and the mark 23 installed thereto.

The pin 3 includes a first section 304 and a second section 305 which is formed to the first section 304. The diameter of the second section 305 is smaller than that of the first section 304. The first end 31 of the pin 31 is located in the first section 304, and the second end 32 of the pin 3 is located in the second section 305. The through hole 21 includes a first-diameter area 211 and a second-diameter area 212 which is formed to the first-diameter area 211. The first section 304 of the pin 3 is located in the first-diameter area 211, and the second section 305 of the pin 3 is located in the second-diameter area 212. Therefore, the pin 3 is installed to the knob 2 by a pre-set direction, and the pin 3 is restricted from being separated downward from the through hole 21. The legs 301, the gap 302 and the enlarged heads 303 are located in the second-diameter area 212.

The notch 24 communicates with the first-diameter area 211. The protrusion 34 extends radially from the first section 304 and is engaged with the notch 24 to restrict the pin 3 from spinning. The underside of the protrusion 34 is restricted by the inner bottom of the notch 24 so that the pin 3 cannot separate downward from the through hole 21.

While we have shown and described the embodiment in accordance with the present invention, it should be clear to those skilled in the art that further embodiments may be made without departing from the scope of the present invention.

What is claimed is:

1. A gas valve comprising:
 a body having a gas path, a valve, and a restriction face, the valve threadedly connected to the body so as to open the gas path or close the gas path, the valve including a top end, wherein the valve is located at a center of the restriction face;
 a knob having a bore and a through hole defined through the knob, wherein the top end of the valve is fixed to the bore and exposed beyond the body; and
 a pin movably extending through the through hole and including a first end and a second end, the first and second ends respectively protruding beyond two ends of the through hole of the knob, the second end of the pin contacting the restriction face;
 wherein when the knob is rotated to drive the valve to a turn-off position, the first end of the pin protrudes beyond the through hole, and when the knob is rotated to drive the valve to a turn-on position, the first end of the pin does not protrude beyond the through hole.

2. The gas valve as claimed in claim 1, wherein the pin includes two legs and each leg includes an enlarged head which is located close to the second end of the pin to restrict the pin from being separated from the through hole.

3. The gas valve as claimed in claim 1, wherein the knob includes a top surface, a mark formed on the top surface, and a notch being defined in an inner periphery of the through hole and extending toward the mark; wherein the through hole opens through the top surface, the pin includes a protrusion extends radially from an outer periphery of the first end of the pin, and the protrusion extends toward the notch and the mark.

4. The gas valve as claimed in claim 3, wherein the mark protrudes from the top surface and is located corresponding to the turn-off position.

5. The gas valve as claimed in claim 1, wherein the first end of the pin is a curved end.

6. An indicator structure comprising:
 a knob having a through hole defined therethrough, and
 a pin movably extending through the through hole, the pin including a first end and a second end, the first and second ends of the pin respectively located beyond the through hole, wherein when the pin is applied by a force, the pin is moved axially in the through hole;
 wherein the knob includes a top surface, a mark formed on the top surface, and a notch being defined in an inner periphery of the through hole and extending toward the mark;
 wherein the through hole opens through the top surface, the pin includes a protrusion extends radially from an outer periphery thereof, and the protrusion extends toward the notch and the mark; and
 wherein the knob includes a bore defined centrally therethrough, the through hole is located in a radial direction of the bore, and the through hole is located between the mark and the bore.

7. The indicator structure as claimed in claim 6, wherein the knob includes a recess formed in the top surface thereof, and the recess communicates with the bore and the through hole, so that a portion of the pin is located between the through hole and the recess.

8. The indicator structure as claimed in claim 7, wherein the pin includes a first section and a second section which is formed to the first section wherein a diameter of the second section is smaller than that of the first section, the first end of the pin is located in the first section, and the second end of the pin is located in the second section; wherein the through hole includes a first-diameter area and a second-diameter area which is formed to the first-diameter area, the first section of the pin is located in the first-diameter area, and the second section of the pin is located in the second-diameter area.

9. The indicator structure as claimed in claim 8, wherein the notch communicates with the first-diameter area, and the protrusion extends radially from the first section.

\* \* \* \* \*